(12) United States Patent
Betz et al.

(10) Patent No.: US 12,654,659 B2
(45) Date of Patent: Jun. 16, 2026

(54) ROUGH ROAD DETECTION FOR VEHICLES

(71) Applicant: GM GLOBAL TECHNOLOGY OPERATIONS LLC, Detroit, MI (US)

(72) Inventors: Ian Betz, Howell, MI (US); Emilio Olay, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/950,786

(22) Filed: Nov. 18, 2024

(65) Prior Publication Data

US 2026/0138573 A1 May 21, 2026

(51) Int. Cl.
  B60T 8/171 (2006.01)
  B60T 8/172 (2006.01)
(52) U.S. Cl.
  CPC ............ B60T 8/171 (2013.01); B60T 8/1725 (2013.01); *B60T 2210/14* (2013.01)
(58) Field of Classification Search
  CPC ..... B60T 8/171; B60T 8/1725; B60T 2210/14
  USPC .......................................... 701/70
  See application file for complete search history.

(56) References Cited

U.S. PATENT DOCUMENTS

2023/0184563 A1* 6/2023 Arreaza ............. G01C 21/3822
                                                    701/450

FOREIGN PATENT DOCUMENTS

| CN | 110525440 | B  | 6/2021  |
|----|-----------|----|---------|
| DE | 3812600   | A1 | 11/1988 |
| DE | 19537257  | A1 | 4/1996  |
| DE | 19626398  | A1 | 1/1997  |
| DE | 10007142  | A1 | 8/2000  |
| DE | 10117351  | A1 | 10/2001 |
| DE | 102007054082 | A1 | 7/2008 |
| DE | 102009012128 | A1 | 9/2010 |
| DE | 102022120968 | A1 | 6/2023 |

* cited by examiner

*Primary Examiner* — Lindsay M Low
*Assistant Examiner* — Omar Morales
(74) *Attorney, Agent, or Firm* — Ingrassia Fisher & Lorenz, LLP | IF&L

(57) ABSTRACT

Methods and systems are provided that include wheel speed sensors of a vehicle that are configured to obtain wheel speed sensor data as to a speed of wheels of the vehicle; and a processor that is coupled to the wheel speed sensors and that is configured to at least facilitate determining a variability of the wheel speed sensor data; and determining a measure of roughness of a path on which the vehicle is operating, based on the variability.

13 Claims, 18 Drawing Sheets

ROUGH ROAD DETECTION FOR VEHICLES

INTRODUCTION

The technical field generally relates to vehicles and, more specifically, to methods and systems for detecting a roughness of a road or path on which a vehicle is travelling, and for controlling vehicle actions based on the roughness of the surface.

Certain vehicles today have control systems for controlling various vehicle actions, such as braking or other vehicle actions. Such vehicle actions may be affected by a roughness of a road or surface in which the vehicle is travelling.

Accordingly, it is desirable to provide improved methods and systems for detecting a roughness of a road or path on which a vehicle is travelling, and for controlling vehicle actions based on the roughness of the road or path. Furthermore, other desirable features and characteristics of the present disclosure will become apparent from the subsequent detailed description and the appended claims, taken in conjunction with the accompanying drawings and the foregoing technical field and background.

SUMMARY

In an exemplary embodiment, a method is provided that includes obtaining, via one or more wheel speed sensors of a vehicle, wheel speed sensor data as to a speed of wheels of the vehicle; determining, via a processor of the vehicle, a variability of the wheel speed sensor data; and determining, via the processor, a measure of roughness of a path on which the vehicle is operating, based on the variability.

Also in an exemplary embodiment, the method further includes taking a vehicle control action, in accordance with instructions provided by the processor, based on the measure of roughness.

Also in an exemplary embodiment, the step of taking the vehicle control action includes controlling braking of the vehicle via a braking system of the vehicle based on the measure of roughness, in accordance with instructions provided by the processor.

Also in an exemplary embodiment, the measure of roughness is determined by the processor based on a rolling average of the variability of the wheel speed sensor data.

Also in an exemplary embodiment, the measure of roughness is determined by the processor also based on corner detection and rejection of the wheel speed sensor data.

Also in an exemplary embodiment, the rolling average is calculated by the processor in accordance with the following equation: $\bar{X}_n = \bar{X}_{n-1} + (X_n - \bar{X}_{n-1})/n$, in "$X_n$" represents wheel speed at a current time, $\bar{X}_n$ represents a current rolling average at the current time, $\bar{X}_{n-1}$ represents a previous rolling average, and "n" represents a number of samples in an average window; and the rolling variance of an average of the wheel speed sensor data is calculated by the processor in accordance with the following equation: $\sigma^2_n = \sigma^2_{n-1} + [(X_n - \bar{X}_{n-1}) - \sigma^2_{n-1}]/n$, in which $\sigma^2_n$ represents a current variance, $\sigma^2_{n-1}$ represents a previous variance, and $X_n$ represents a current wheel noise sample.

Also in an exemplary embodiment, the calculating of the rolling average is implemented by the processor using Welford's algorithm.

Also in an exemplary embodiment, the method further includes binning, via the processor, the measure of roughness for the vehicle into one of the following categories: (i) smooth, if the variability is less than a first predetermined threshold; (ii) low, if the variability is greater than the first predetermined threshold and less than a second predetermined threshold; (iii) mid, if the variability is greater than the second predetermined threshold and less than a third predetermined threshold; (iv) high, if the variability is greater than the third predetermined threshold and less than a fourth predetermined threshold; and (v) extreme, if the variability is greater than the fourth predetermined threshold; and wherein the vehicle control action includes adjusting a braking threshold for a braking system of the vehicle, in accordance with instructions providing by the processor to the braking system, based on the binning.

In another exemplary embodiment, a system is provided that includes one or more wheel speed sensors of a vehicle and a processor. The one or more wheel speed sensors are configured to obtain wheel speed sensor data as to a speed of wheels of the vehicle. The processor is coupled to the one or more wheel speed sensors, and is configured to at least facilitate determining a variability of the wheel speed sensor data; and determining a measure of roughness of a path on which the vehicle is operating, based on the variability.

Also in an exemplary embodiment, the processor is further configured to at least facilitate taking a vehicle control action via control of one or more of the following: torque distribution, propulsion control, and drive and suspension type, in accordance with instructions provided by the processor, based on the measure of roughness.

Also in an exemplary embodiment, the processor is further configured to at least facilitate controlling braking of the vehicle via a braking system of the vehicle based on the measure of roughness, in accordance with instructions provided by the processor.

Also in an exemplary embodiment, the processor is further configured to at least facilitate determining the measure of roughness based on a rolling average of the variability of the wheel speed sensor data.

Also in an exemplary embodiment, the processor is further configured to at least facilitate determining the measure of roughness also based on a rolling variance of the wheel speed sensor data.

Also in an exemplary embodiment, the processor is further configured to at least facilitate determining the measure of roughness also based on corner detection and rejection of the wheel speed sensor data.

Also in an exemplary embodiment, the processor is further configured to at least facilitate calculating the rolling average in accordance with the following equation: $\bar{X}_n = \bar{X}_{n-1} + (X_n - \bar{X}_{n-1})/n$, in "$X_n$" represents wheel speed at a current time, $\bar{X}_n$ represents current rolling average at the current time, $\bar{X}_{n-1}$ represents a previous rolling average, and "n" represents a number of samples in an average window; and calculating the rolling variance of an average of the wheel speed sensor data in accordance with the following equation: $\sigma^2_n = \sigma^2_{n-1} + [(X_n - \bar{X}_{n-1}) - \sigma^2_{n-1}]/n$, in which $\sigma^2_n$ represents a current variance, $\sigma^2_{n-1}$ represents a previous variance, and $X_n$ represents a current wheel noise sample.

Also in an exemplary embodiment, the processor is further configured to at least facilitate binning the measure of roughness for the vehicle into one of the following categories: (i) smooth, if the variability is less than a first predetermined threshold; (ii) low, if the variability is greater than the first predetermined threshold and less than a second predetermined threshold; (iii) mid, if the variability is greater than the second predetermined threshold and less than a third predetermined threshold; (iv) high, if the variability is greater than the third predetermined threshold and less than a fourth predetermined threshold; and (v) extreme, if the variability is greater than the fourth predetermined threshold; and adjusting a braking threshold for a braking system of the vehicle, in accordance with instructions provided by the processor to the braking system, based on the binning.

In another exemplary embodiment, a vehicle is provided that includes a body, a drive system, a braking system, one or more wheel speed sensor, and a processor. The drive system is configured to move the body. The one or more wheel speed sensors are configured to obtain wheel speed sensor data as to a speed of wheels of the vehicle. The processor is coupled to the one or more wheel speed sensors and to the braking system, the processor configured to at least facilitate determining a variability of the wheel speed sensor data; determining a measure of roughness of a path on which the vehicle is operating, based on the variability, including by based on a rolling average of the variability of the wheel speed sensor data; a rolling variance of the wheel speed sensor data; and corner detection and rejection of the wheel speed sensor data; and controlling braking of the vehicle based on the measure of roughness, in accordance with instructions provided by the processor that are implemented by the braking system.

Also in an exemplary embodiment, the processor is further configured to at least facilitate automatically controlling each of the following: torque distribution, propulsion control, and drive and suspension type, in accordance with instructions provided by the processor, based on the measure of roughness.

Also in an exemplary embodiment, the processor is further configured to at least facilitate calculating the rolling average in accordance with the following equation: $\overline{X}_n = \overline{X}_{n-1} + (X_n - \overline{X}_{n-1})/n$, in "$X_n$" represents wheel speed at a current time, $\overline{X}_n$ represents a current rolling average at the current time, $\overline{X}_{n-1}$ represents a previous rolling average, and "n" represents a number of samples in an average window; calculating the rolling variance of an average of the wheel speed sensor data in accordance with the following equation: $\sigma^2_n = \sigma^2_{n-1} + [(X_n - \overline{X}_{n-1}) - \sigma^2_{n-1}]/n$, in which $\sigma^2_n$ represents a current variance, $\sigma^2_{n-1}$ represents a previous variance, and $X_n$ represents a current wheel noise sample; binning the measure of roughness for the vehicle into one of the following categories: (i) smooth, if the variability is less than a first predetermined threshold; (ii) low, if the variability is greater than the first predetermined threshold and less than a second predetermined threshold; (iii) mid, if the variability is greater than the second predetermined threshold and less than a third predetermined threshold; (iv) high, if the variability is greater than the third predetermined threshold and less than a fourth predetermined threshold; and (v) extreme, if the variability is greater than the fourth predetermined threshold; and adjusting a braking threshold for the braking system of the vehicle, in accordance with instructions providing by the processor to the braking system, based on the binning.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
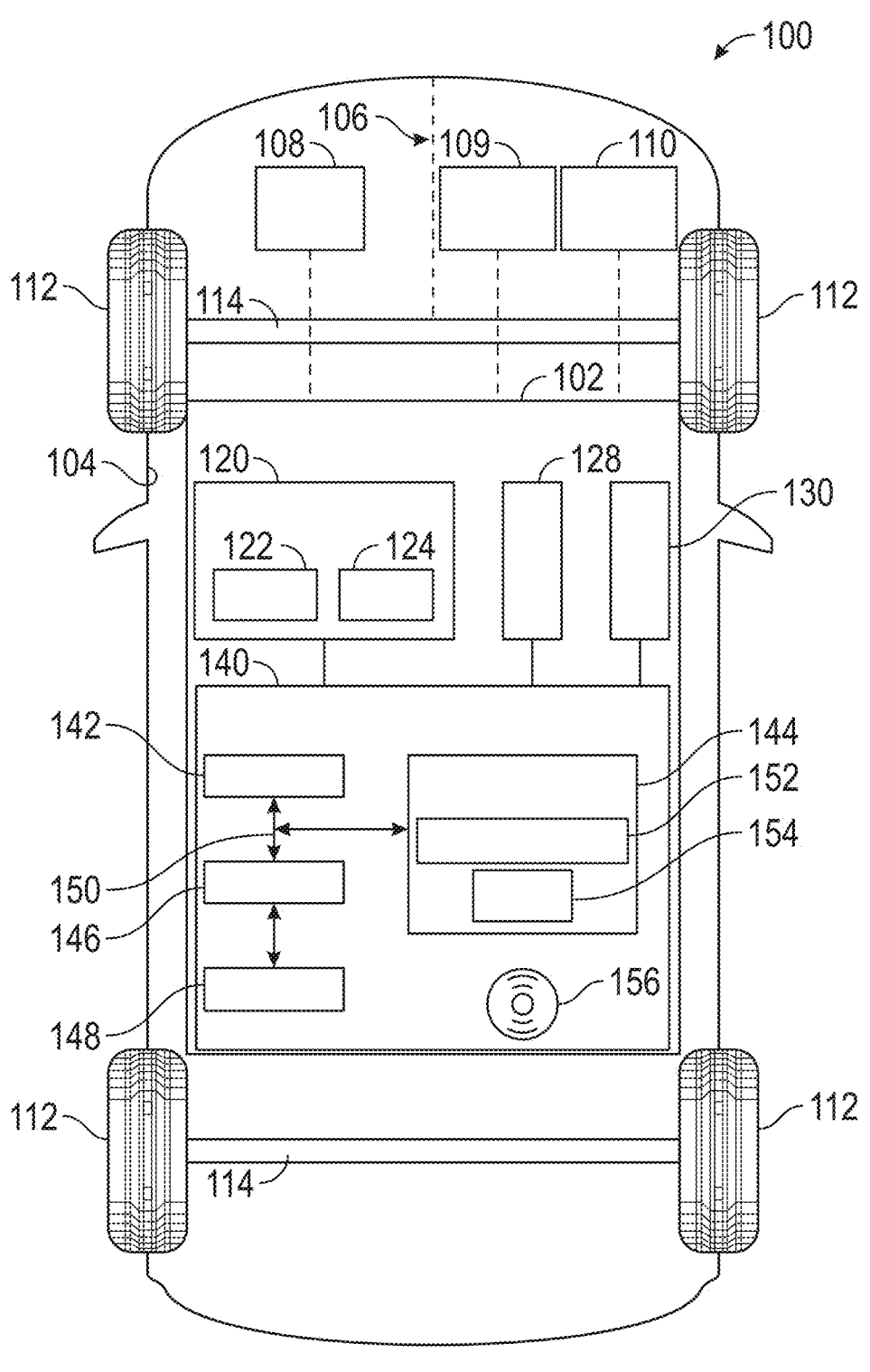
FIG. 1 is a functional block diagram of a vehicle that includes a control system for detecting a roughness of a road or path on which the vehicle is travelling, and for controlling vehicle actions based on the roughness of the road or path, in accordance with exemplary embodiments.

FIG. 1 illustrates a vehicle 100, according to an exemplary embodiment. As described in greater detail further below, the vehicle 100 includes a control system 102 that is configured for detecting a roughness of a road or path on which a vehicle is travelling based on variability of road wheel sensor data as determined via the control system 102, and for controlling vehicle actions including vehicle braking based on the roughness of the road or path, in accordance with exemplary embodiments.

As used throughout this Application, the terms "path", "road", and "roadway" (and any variations thereof) refer to a path (including a road or other path) of a surface on which the vehicle 100 travels. As described herein, the path and its surface may include dirt, gravel, asphalt, concrete and/or other types of paths of various different roughness, as determined via the control system 102 (as alluded to above and as described in greater detail further below).

In various embodiments, the vehicle 100 includes an automobile. The vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In certain embodiments, the vehicle 100 may also comprise a motorcycle or other vehicle, such as aircraft, spacecraft, watercraft, and so on, and/or one or more other types of mobile platforms (e.g., a robot and/or other mobile platform).

The vehicle 100 includes a body 104 that is arranged on a chassis 106. The body 104 substantially encloses other components of the vehicle 100. The body 104 and the chassis 106 may jointly form a frame. The vehicle 100 also includes a plurality of wheels 112. The wheels 112 are each rotationally coupled to the chassis 106 near a respective corner of the body 104 to facilitate movement of the vehicle 100. In one embodiment, the vehicle 100 includes four wheels 112, although this may vary in other embodiments (for example for trucks and certain other vehicles).

As depicted in FIG. 1, the vehicle 100 includes a braking system 108 in various embodiments. In exemplary embodiments, the braking system 108 controls braking of the vehicle 100 using braking components that are controlled via inputs provided by a driver (e.g., via a braking pedal in certain embodiments) and/or automatically via the control system 102. In certain embodiments, the braking system 108 is automatically controlled by the control system 102 in different manners (including different anti-lock braking thresholds in certain embodiments) based on the roughness of the path as determined via the control system 102.

In exemplary embodiments, the vehicle 100 also includes a steering system 109 that controls steering of the vehicle 100. In various embodiments, the steering system 109 controls steering of the vehicle 100 via steering components, and is controlled via inputs provided in certain instances by a driver via a steering wheel, and in certain other instances automatically via the control system 102. In certain embodiments, the steering system 109 may be automatically controlled by the control system 102 in different manners (including different steering thresholds in certain embodiments) based on the roughness of the path as determined via the control system 102.

Also in exemplary embodiments, a drive system 110 is mounted on the chassis 106, and drives the wheels 112, for example via axles 114. In certain embodiments, the drive system 110 comprises a propulsion system. In certain exemplary embodiments, the drive system 110 comprises an internal combustion engine and/or an electric motor/generator, coupled with a transmission thereof. In certain embodiments, the drive system 110 may vary, and/or two or more drive systems 110 may be used. Also in exemplary embodiments, the drive system 110 controls propulsion of the vehicle 100 in accordance with via inputs provided by a driver (e.g., via an accelerator pedal) and/or automatically via the control system 102. In certain embodiments, the drive system 110 may be automatically controlled by the control system 102 in different manners (including different propulsion thresholds in certain embodiments) based on the roughness of the path as determined via the control system 102.

In the embodiment depicted in FIG. 1, the control system 102 is coupled to the steering system 109, the braking system 108, and the propulsion system 110. In certain embodiments, the control system 102 may also be coupled to one or more other vehicle systems and/or components.

In various embodiments, as noted above, the control system 102 detects a roughness of a road or path on which the vehicle 100 is travelling, and control. vehicle actions based on the roughness of the road or path. In various embodiments, the control system 102 provides these functions in accordance with the process 200 of FIG. 2 and implementations of FIGS. 3-16, and as described in greater detail further below in connection therewith. In certain embodiments, the control system 102 may also control one or more other systems of the vehicle 100.

As depicted in FIG. 1, in various embodiments, the control system 102 includes a sensor array 120 and a controller 140, as described in greater detail below. In certain embodiments, the control system 102 also includes a location system 128 (e.g., GPS) and a transceiver 130.

In various embodiments, the sensor array 120 includes various sensors that obtain sensor data as to a wheel speed of wheels 112 of the vehicle 100. Also in various embodiments, one or more variances of the sensor data (including variances as to sensor data pertaining to the wheel speeds) are utilized by the control system 102 in determining a roughness of a road or path on which the vehicle 100 is travelling, including for use in controlling one or more vehicle actions (e.g., including braking in various embodiments). In the depicted embodiment, the sensor array 120 includes one or more wheel speed sensors 122. In certain embodiments, the sensor array 120 may also include one or more other sensors 124.

In an exemplary embodiments, the one or more wheel speed sensors 122 obtain wheel speed sensor data as to wheels 112 of the vehicle 100. In certain embodiments, the wheel speed sensors 122 obtain wheel speed sensor data as to a speed of each of the wheels 112 of the vehicle 100.

In addition, in certain embodiments, the sensor array 120 may also include one or more other sensors 124, such as one or more transmission sensors (e.g., for determining when the vehicle 100 is turned on activated for a current vehicle drive, and so on), one or more user input sensors (e.g., for braking, steering, propulsion, or the like), and/or other types of other sensors 124 in various embodiments.

In various embodiments, the controller 140 is coupled to the sensor array 120 and to the location system 128, and the braking system 108, and in certain embodiments also to the steering system 109 and the drive system 110. In various embodiments, the controller 140 may also be coupled to one or more other vehicle systems, as noted above. Also in various embodiments, the controller 140 comprises a computer system (also referred to herein as computer system 140), and includes a processor 142, a memory 144, an interface 146, a storage device 148, and a computer bus 150. In various embodiments, the controller (or computer system) detects a roughness of a road or path on which the vehicle 100 is travelling, and control. vehicle actions based on the roughness of the road or path. In various embodiments, the controller 140 provides these and other functions in accordance with the steps of the process 200 of FIG. 2 and implementations of FIGS. 3-16.

In various embodiments, the controller 140 (and, in certain embodiments, the control system 102 itself) is disposed within the body 104 of the vehicle 100. In one embodiment, the control system 102 is mounted on the chassis 106.

It will be appreciated that the controller 140 may otherwise differ from the embodiment depicted in FIG. 1. For example, the controller 140 may be coupled to or may otherwise utilize one or more remote computer systems and/or other control systems, for example as part of one or more of the above-identified vehicle 100 devices and systems.

In the depicted embodiment, the computer system of the controller 140 includes a processor 142, a memory 144, an interface 146, a storage device 148, and a bus 150. The processor 142 performs the computation and control functions of the controller 140, and may comprise any type of processor or multiple processors, single integrated circuits such as a microprocessor, or any suitable number of integrated circuit devices and/or circuit boards working in cooperation to accomplish the functions of a processing unit. During operation, the processor 142 executes one or more programs 152 contained within the memory 144 and, as such, controls the general operation of the controller 140 and the computer system of the controller 140, generally in executing the processes described herein, such as the process 200 of FIG. 2 and implementations of FIGS. 3-16.

The memory 144 can be any type of suitable memory. For example, the memory 144 may include various types of dynamic random access memory (DRAM) such as SDRAM, the various types of static RAM (SRAM), and the various types of non-volatile memory (PROM, EPROM, and flash). In certain examples, the memory 144 is located on and/or co-located on the same computer chip as the processor 142. In the depicted embodiment, the memory 144 stores the above-referenced program 152 along with stored values 157 (e.g., threshold values for the process 200 of FIG. 2 and implementations of FIGS. 3-16 in various embodiments).

The bus 150 serves to transmit programs, data, status and other information or signals between the various components of the computer system of the controller 140. The interface 146 allows communication to the computer system of the controller 140, for example from a system driver and/or another computer system, and can be implemented using any suitable method and apparatus. In one embodiment, the interface 146 obtains the various data from the sensor array 120, among other possible data sources. The interface 146 can include one or more network interfaces to communicate with other systems or components. The interface 146 may also include one or more network interfaces to communicate with technicians, and/or one or more storage interfaces to connect to storage apparatuses, such as the storage device 148.

The storage device 148 can be any suitable type of storage apparatus, including various different types of direct access storage and/or other memory devices. In one exemplary embodiment, the storage device 148 comprises a program product from which memory 144 can receive a program 152 that executes one or more embodiments of one or more processes of the present disclosure, such as the steps of the process 200 discussed further below in connection with FIG. 2. In another exemplary embodiment, the program product may be directly stored in and/or otherwise accessed by the memory 144 and/or a disk (e.g., disk 156), such as that referenced below.

The bus 150 can be any suitable physical or logical means of connecting computer systems and components. This includes, but is not limited to, direct hard-wired connections, fiber optics, infrared and wireless bus technologies. During operation, the program 152 is stored in the memory 144 and executed by the processor 142.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 142) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 140 may also otherwise differ from the embodiment depicted in FIG.

1, for example in that the computer system of the controller 140 may be coupled to or may otherwise utilize one or more remote computer systems and/or other control systems.

Figure 2:
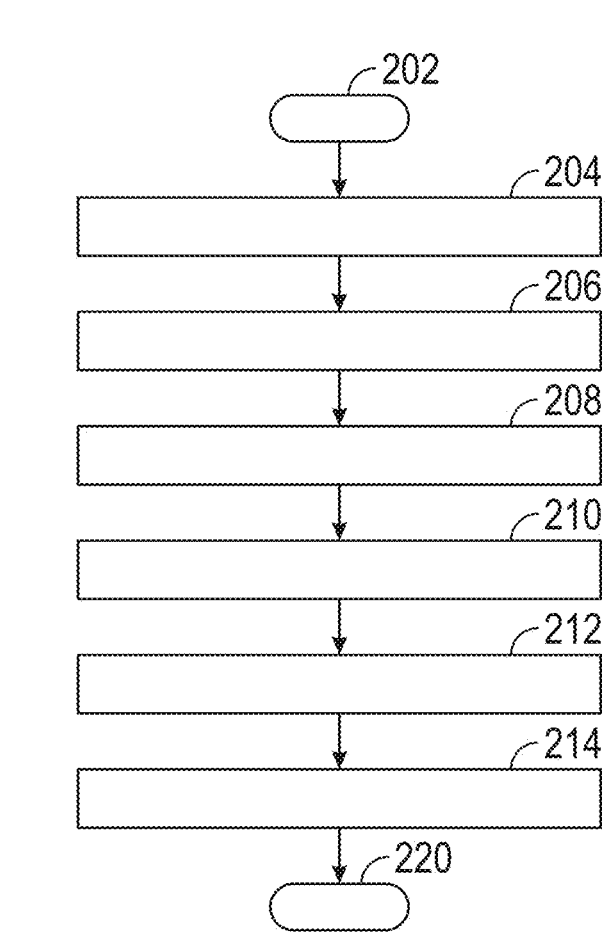
FIG. 2 is a flowchart of a process for detecting a roughness of a road or path on which a vehicle is travelling, and for controlling vehicle actions based on the roughness of the road or path, and that can be implemented in connection with the vehicle of FIG. 1, including the control system of FIG. 1.

FIG. 2 is a flowchart of a process 200 for detecting a roughness of a road or path on which a vehicle is travelling, and for controlling vehicle actions based on the roughness of the road or path, in accordance with exemplary embodiments. Also in various embodiments, the process 200 can be implemented in connection with the vehicle 100 of FIG. 1, including the control system 102 of FIG. 1, and components thereof.

As depicted in FIG. 2, in various embodiments, the process 200 begins at step 202. In one embodiment, the process 200 begins when a vehicle drive or ignition cycle begins, for example when a driver enters the vehicle for operation of the vehicle (e.g., as detected one or more of the other sensors 124 of the sensor array 120 of FIG. 1 in certain embodiments). In one embodiment, the steps of the process 200 are performed continuously during operation of the vehicle.

In various embodiments, sensor data is obtained (step 204). In various embodiments, wheel speed sensor data is obtained from the wheel speed sensors 122 of FIG. 1 as to values of speed of the wheels 112 of FIG. 1. In certain embodiments, location data is also obtained as to a geographic location of the vehicle 100 (e.g., via the location system 128, such as a GPS system, of FIG. 1).

In various embodiments, a rolling average is calculated (step 206). In various embodiments, during step 206 the processor 142 of FIG. 1 calculates a rolling average for the wheel speed values of the wheel speed sensor data obtained from the wheel speed sensors 122 in step 204.

In certain embodiments, the processor 142 calculates the rolling average in accordance with the following equation:

$$\bar{x}_n = \bar{x}_{n-1} + \frac{x_n - \bar{x}_{n-1}}{n}, \qquad \text{(Equation 1)}$$

in "X$_n$," represents wheel speed at a current time, $\bar{X}_n$ represents a current rolling average at the current time, $\bar{X}_{n-1}$ represents the previous rolling average, and "n" represents the number of samples in the average window. In an exemplary embodiment, this is performed using Welford's online algorithm, which significantly reduces the required memory needed to calculate rolling averages and variances.

An additional flowchart is provided in FIG. 3 with additional details of the calculating of the rolling average of step 206 and is described in greater detail further below in connection therewith.

With continued reference to FIG. 2, in an exemplary embodiment rolling variances are calculated (step 208). In various embodiments, the processor 142 of FIG. 1 calculates a rolling variance for the wheel speed values of the wheel speed sensor data based on the rolling average calculated in step 206.

In certain embodiments, the processor 142 calculates the rolling variance in accordance with the following equation:

$$\sigma_n^2 = \sigma_{n-1}^2 + \frac{(x_n - \bar{x}_{n-1})(x_n - \bar{x}_n) - \sigma_{n-1}^2}{n}, \qquad \text{(Equation 2)}$$

in which $\sigma_n^2$ represents the current variance, $\sigma_{n-1}^2$ represents the previous variance (which may be assumed to be equal to zero at "n=1" in certain embodiments, but which may have different values in other embodiments), and $X_n$ represents the current wheel noise sample.

Figure 4:
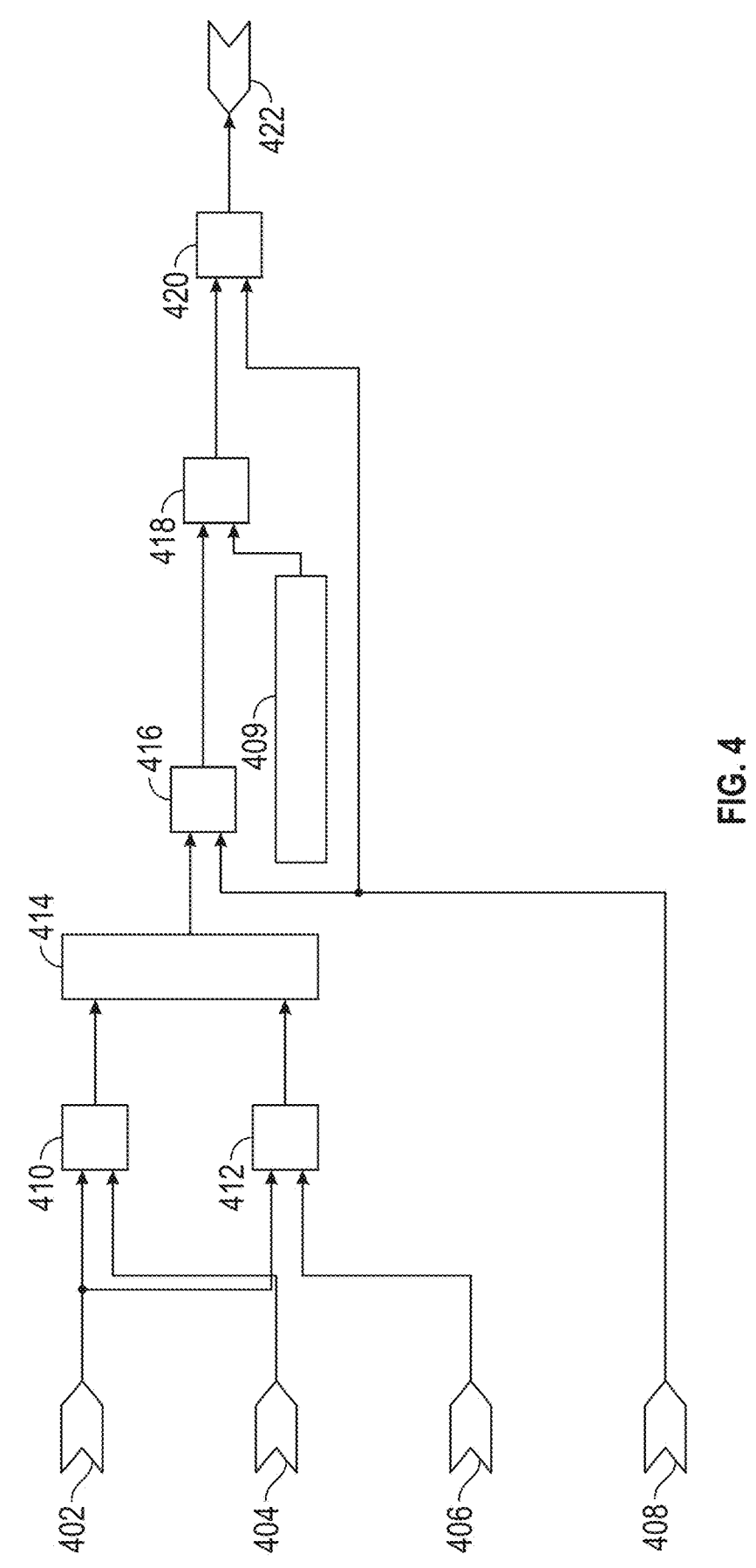
FIG. 4 is a flowchart of another step of the process of FIG. 2, namely for calculating a rolling average of wheel speed sensor noise, in accordance with exemplary embodiments.

An additional flowchart is provided in FIG. 4 with additional details of the calculating of the rolling variance of step 208 and is described in greater detail further below in connection therewith.

With continued reference to FIG. 2, in an exemplary embodiment corner outliers are determined and controlled for (step 210). In various embodiments, the processor 142 of FIG. 1 determines the corner outliers by repeating steps 206 and 208 (and the equations thereof) for each corner of the vehicle 100 (i.e., for a front driver side wheel 112, a front passenger side wheel 112, a rear driver side wheel 112, and a rear passenger side wheel 112). Also in exemplary embodiments, as part of step 210, averages are then taken as to the variances, and each corner's variance is subtracted from the average to determine a difference for that particular corner. Also in various embodiments, if the difference for the particular exceeds a predetermined threshold (e.g., that is stored in the memory 144 of FIG. 1 as a stored value thereof), then the variance for that particular corner is removed from the second stage average. Also in various embodiments, the denominator (e.g., in Equation 2, above) is also adjusted when the variance of a particular corner is removed. Also in various embodiments, the resulting output value comprises a single vehicle level roughness signal for the vehicle 100.

Figure 5A:
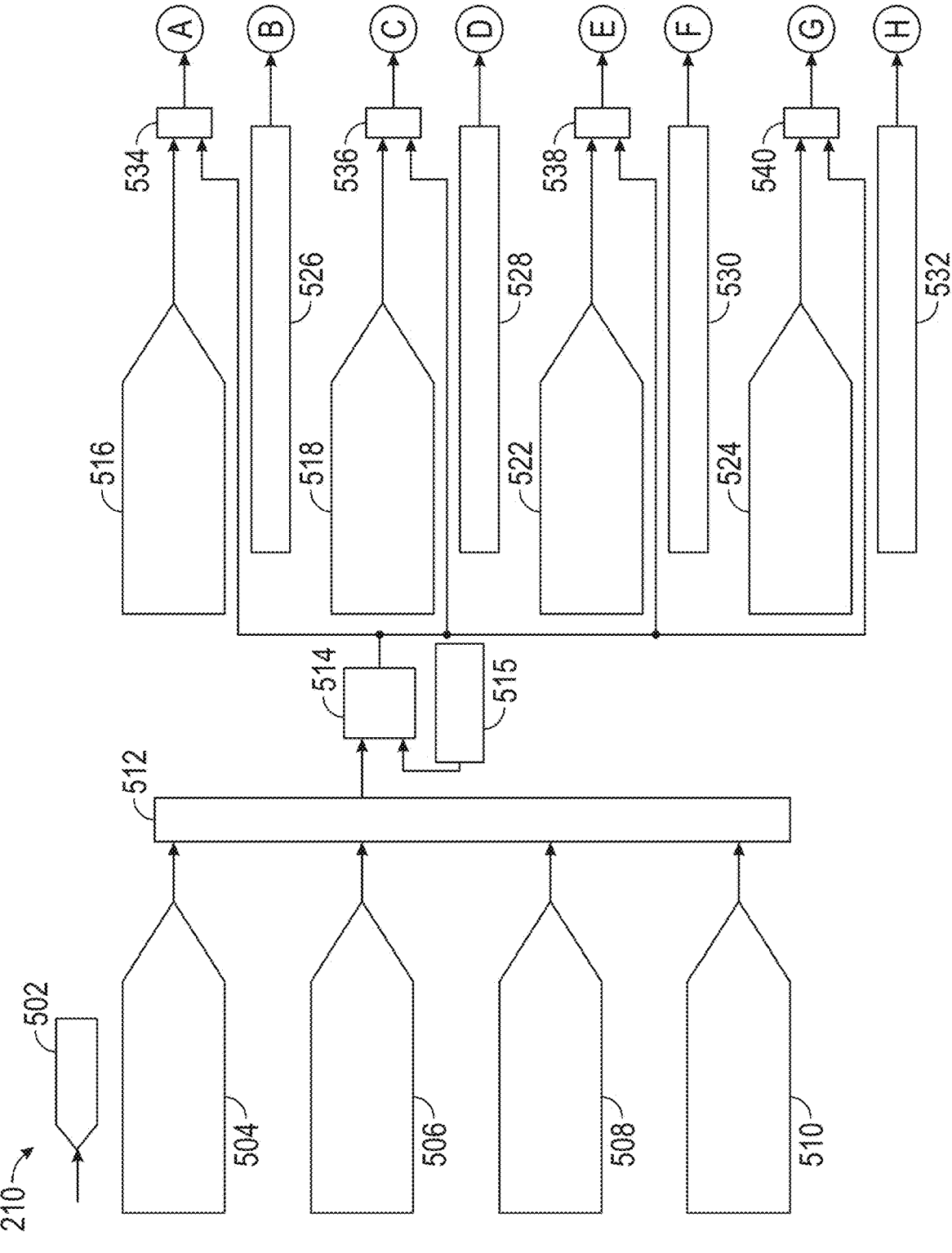
FIG. 5A and FIG. 5B (also collectively referred to as "FIG. 5") provide a flowchart of another step of the process of FIG. 2, namely for detection and rejection of corner outliers, in accordance with exemplary embodiments.
Figure 5B:
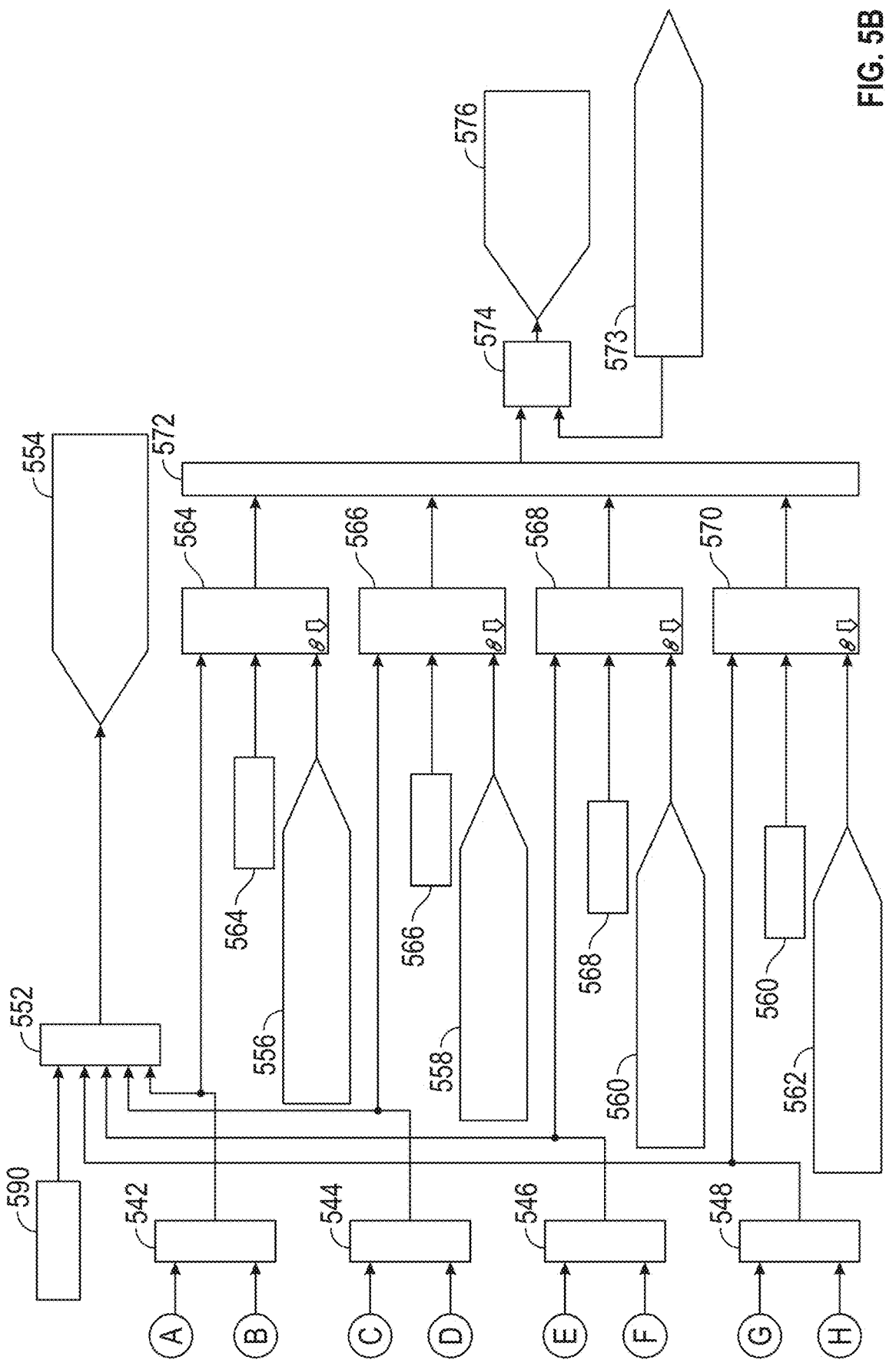

An additional flowchart is provided in FIG. 5 with additional details of the determining and controlling for the corner outliers of step 210 and is described in greater detail further below in connection therewith.

With continued reference to FIG. 2, in an exemplary embodiment binning is performed (step 212). In various embodiments, the processor 142 of FIG. 1 categorizes the roughness of the road surface into one of five categories based on the vehicle level variance. In various embodiments, the roughness is characterized into one of the following categories (i.e., bins), namely: (i) smooth (e.g., a smooth asphalt or concrete surface), if the vehicle level variance is less than a first predetermined threshold; (ii) low (e.g., a light gravel or dirt road), if the vehicle level variance is greater than the first predetermined threshold and less than a second predetermined threshold; (iii) mid (e.g., a road with a relatively greater amount of gravel as compared to the "low" level) if the vehicle level variance is greater than the second predetermined threshold and less than a third predetermined threshold; (iv) high (e.g., bumps or rumble strips on a road) if the vehicle level variance is greater than the third predetermined threshold and less than a fourth predetermined threshold; and (v) extreme (e.g., a cobblestone road) if the vehicle level variance is greater than the fourth predetermined threshold.

In various embodiments, the fourth predetermined threshold of step 212 is greater than the third predetermined threshold, which is greater than the second predetermined threshold, which is greater than the first predetermined threshold. Also in various embodiments, each of these predetermined thresholds of step 211 are stored in the memory 144 of FIG. 1 as stored values 154 thereof.

Figure 6A:
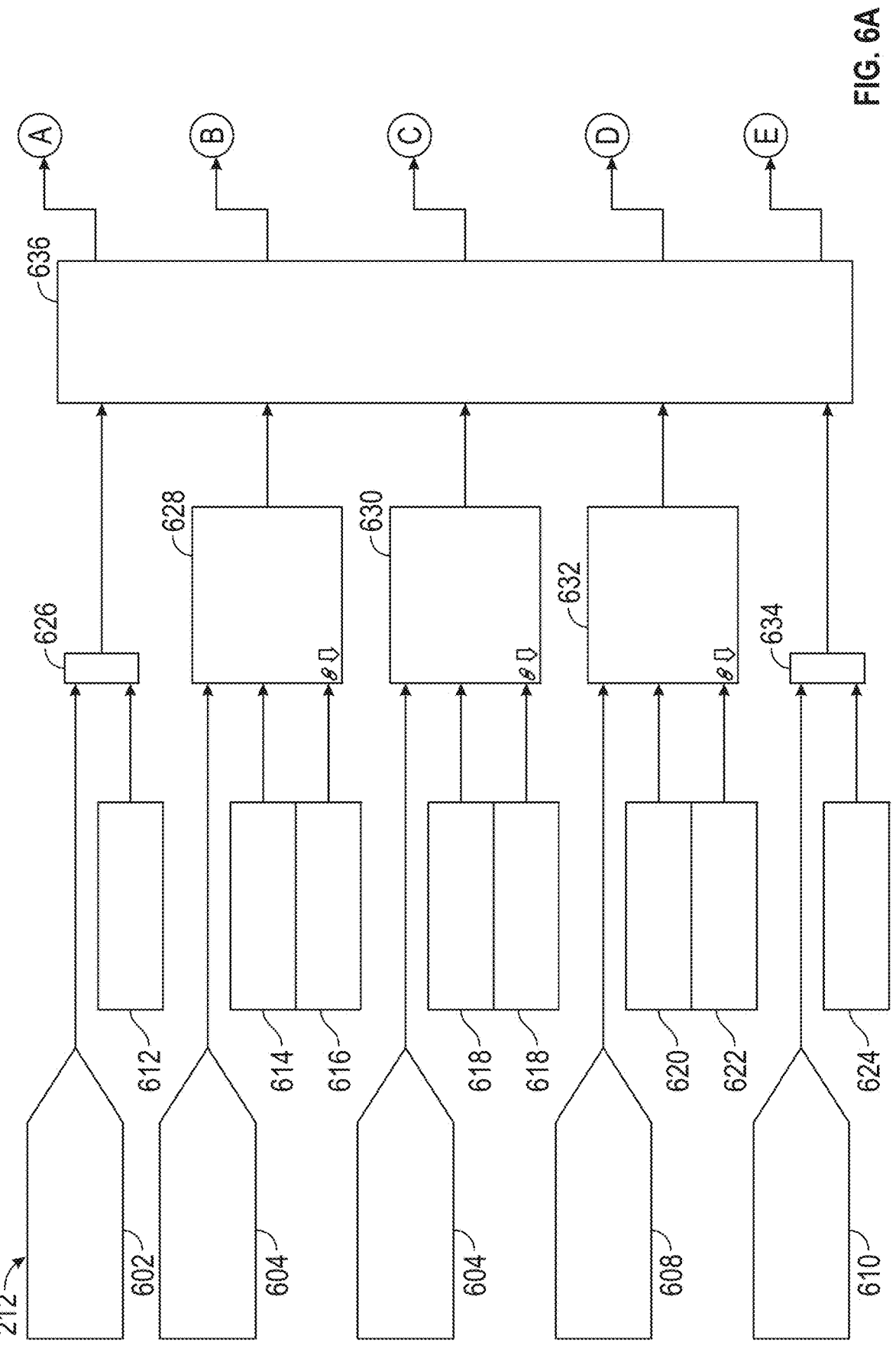
FIG. 6A and FIG. 6B (also collectively referred to herein as "FIG. 6") provide a flowchart of another step of the process of FIG. 2, namely for binning output results for categorizing the roughness of the surface, in accordance with exemplary embodiments.
Figure 6B:
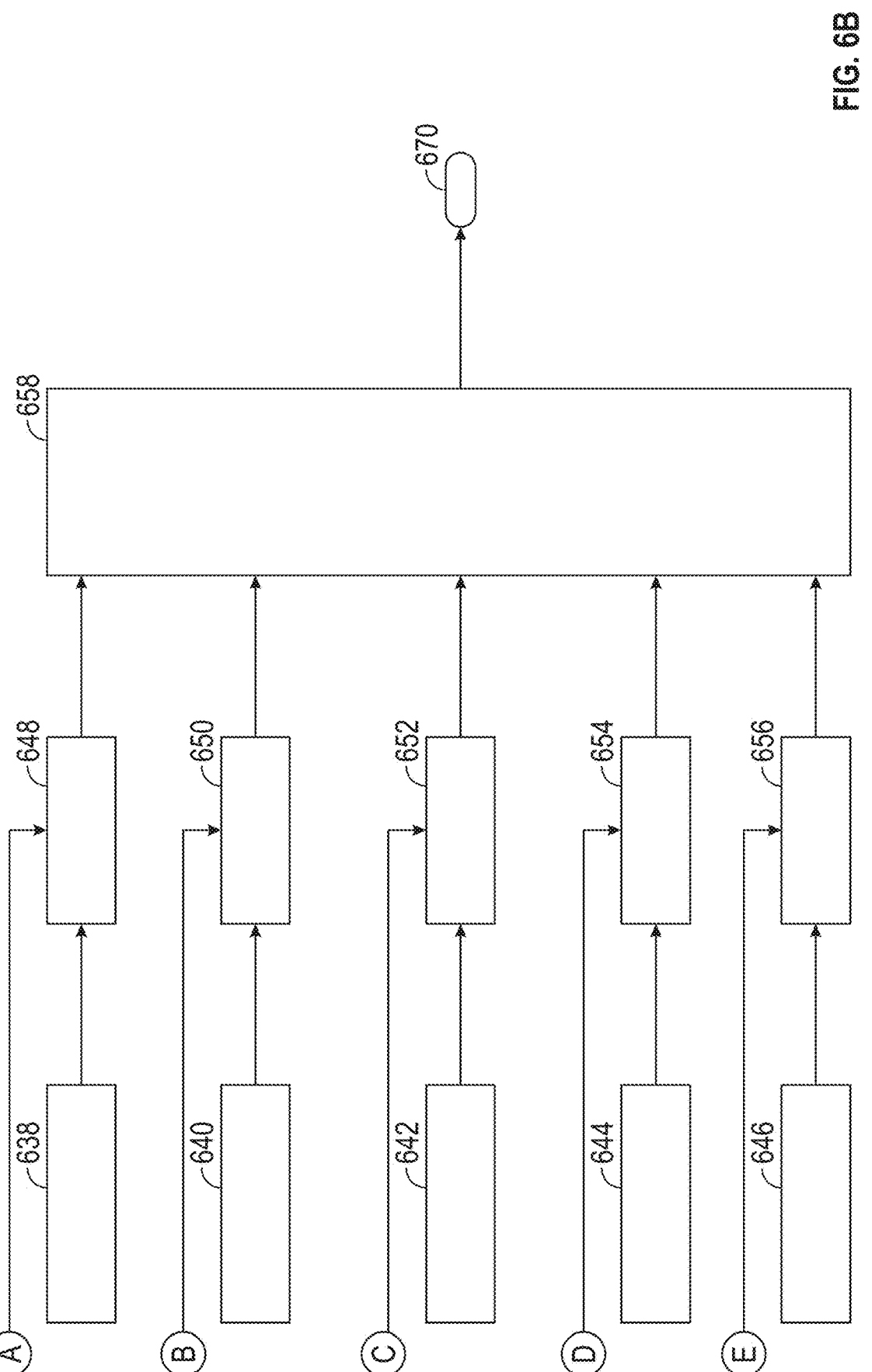

An additional flowchart is provided in FIG. 6 with additional details of the binning of step 212 and is described in greater detail further below in connection therewith.

With continued reference to FIG. 2, one or more vehicle control actions are taken (step 214). In various embodiments the processor 142 of FIG. 1 controls braking of the vehicle 100 via instructions that are provided to the braking system 108 based on the roughness of the surface of the path (i.e., based on the binning output of step 212), with the instructions implemented via the braking system 108 in controlling braking for the vehicle 100. In certain embodiments, the processor 142 adjusts one or more predetermined braking thresholds (e.g. for antilock braking) based on the roughness of the surface of the path (i.e., based on the binning output of step 212). In certain embodiments, the processor 142 may also use the roughness value for control of the steering system 109, the drive system 110, and/or one or more other vehicle systems. In certain embodiments, the vehicle control actions include one or more of the following (and in certain embodiments include each of the following): taking a vehicle control action via control of one or more of the following: torque distribution, propulsion control, and drive and suspension type, in accordance with instructions provided by the processor, based on the measure of roughness.

In various embodiments, the process 200 then terminates at 220.

As noted above, FIGS. 3-6 provide flowcharts of exemplary implementations of certain steps of the process 200 of FIG. 2, in accordance exemplary embodiments.

Figure 3:
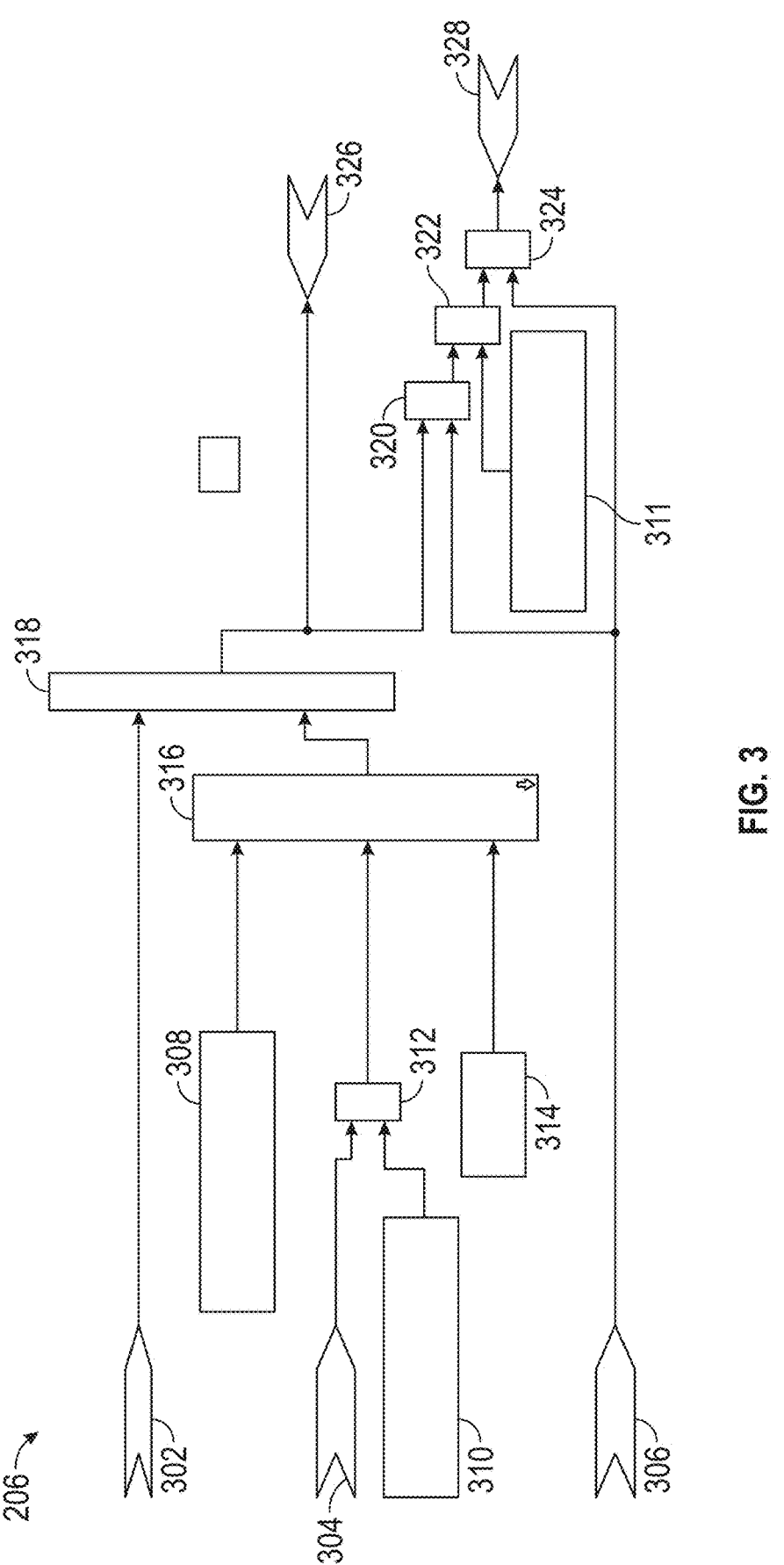
FIG. 3 is a flowchart of a step of the process of FIG. 2, namely for calculating a rolling average of wheel speed sensor noise, in accordance with exemplary embodiments.

With reference to FIG. 3, an illustration is provided for an exemplary implementation of calculating the rolling average of step 206, in accordance with an exemplary embodiment. As shown in FIG. 3, in an exemplary embodiment, the inputs include wheel speed sensor data noise "u" 302 along with a reference velocity (u1) 304 and a previous value of wheel speed sensor noise (u2) 306, along with calibratable values of a normal (or expected) default noise 308 in certain embodiments (e.g., in certain embodiments this may be used in development purposes for turning the normalization login on or off based on feedback from testing), a normal (or expected) gain 310 and a variance window 311.

In various embodiments, the reference velocity (u1) 304 is multiplied by the normal (or expected) gain 310 at step 312. Also in various embodiments, a Boolean determination is made at step 316 as to whether various conditions of the product of step 312 as well as the normal (or expected) default noise 308 and an additional input single value 314, and the result of the Boolean determination of step 316 is multiplied by the wheel speed sensor data noise "u" 302 at step 318.

In various embodiments, the resulting product of step 318 yields a normalized wheel speed sensor noise value (y) 326.

In addition, in various embodiments, the quotient of step 318 has the previous value of wheel speed sensor noise (u2) 306 subtracted from it at step 320. Also in various embodiments, the product of step 320 is then divided by the variance window 311 at step 322, and the product of step 322 is then added to the wheel speed sensor noise (u2) 306 at step 324.

In various embodiments, the resulting sum of step 324 yields a rolling average (y1) 328.

FIGS. 7-16 depict various implementations of graphical representations pertaining the RF variance as compared with RF corner speed (both on the y-axis) RF variance (both on the y-axis) over time (on the x-axis).

Figure 7:
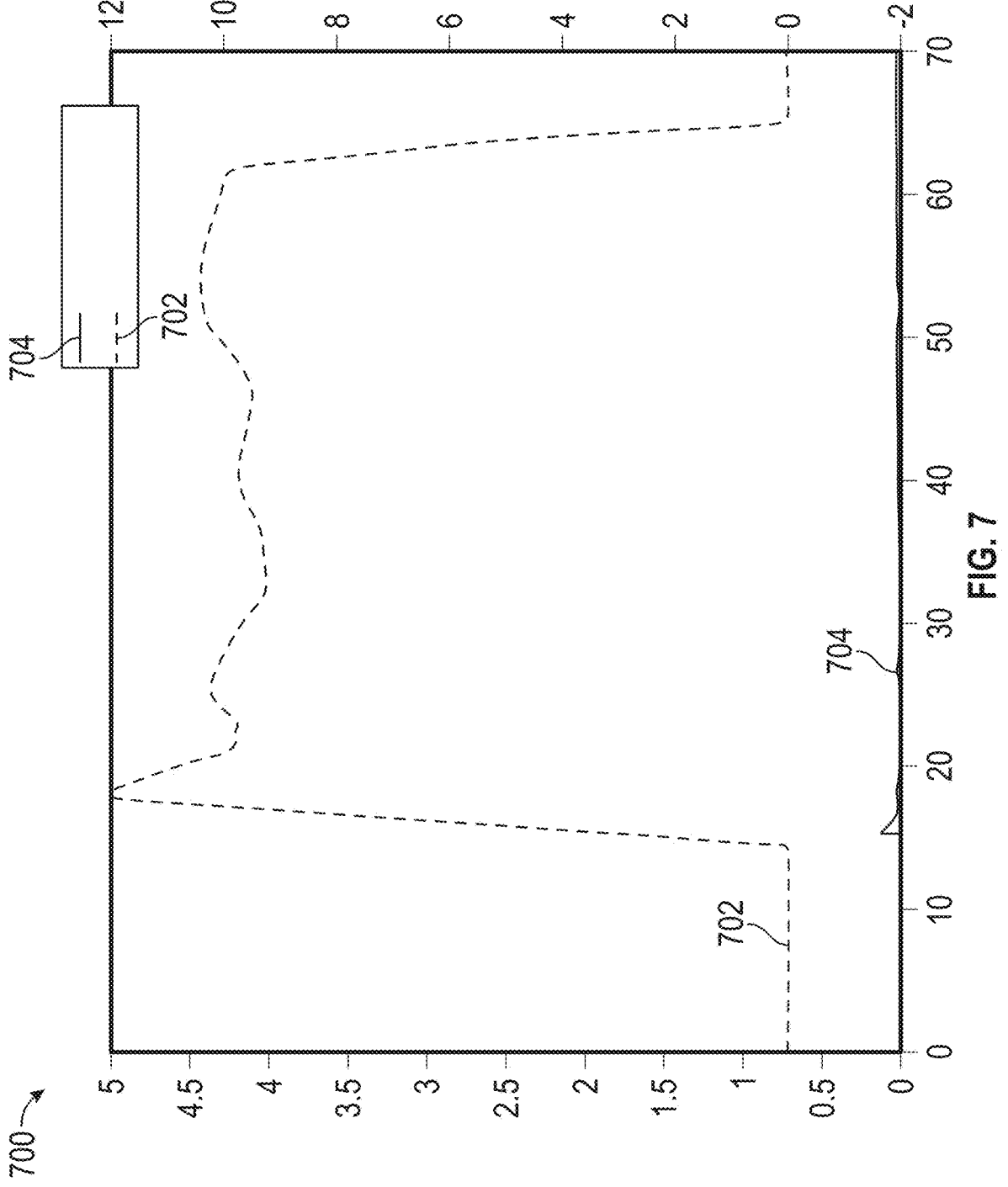
FIGS. 7-16 are depictions of exemplary implementations of the process of FIG. 2 and the steps of FIGS. 2-6 in various exemplary situations of a vehicle travelling at different speeds and on paths of different characterizations of roughness, in accordance with exemplary embodiments.

FIG. 7 shows a first graphical illustration 700 of right front wheel (RF) corner speed 702 and RF variance 704 in a first scenario of a smooth road (e.g., a flat, smooth highway) at approximately ten meters per second (i.e., twenty-two miles per hour). As shown in this graphical illustration 700, under this scenario, the RF corner speed 702 is almost entirely flat, even with variations in the RF variance 704.

Figure 8:
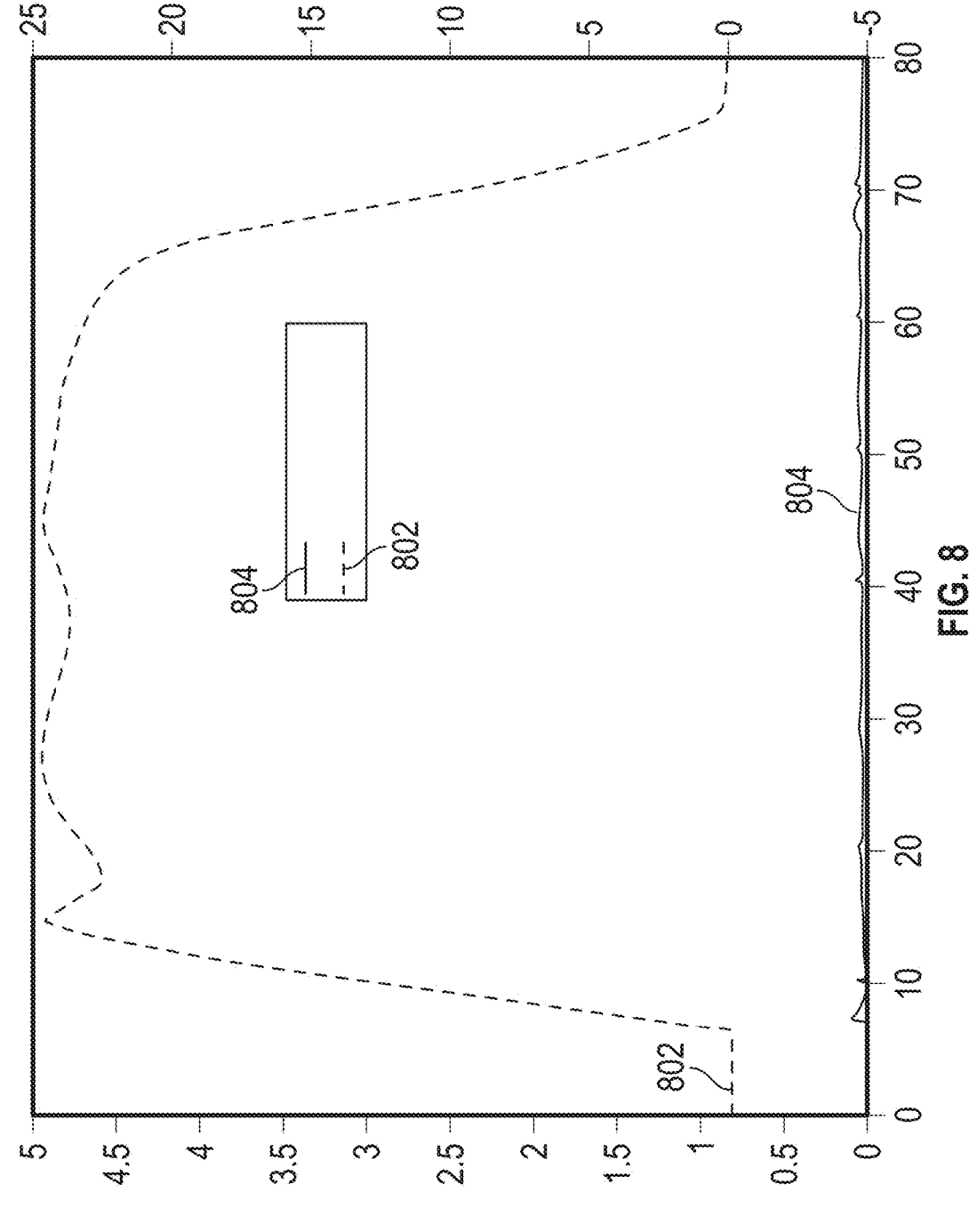

FIG. 8 shows a second graphical illustration 800 of RF corner speed 802 and RF variance 804 in a second scenario of a smooth road (e.g., a flat, smooth highway) at approximately twenty five meters per second (i.e., fifty-six miles per hour). As shown in this graphical illustration 800, under this scenario, the RF corner speed 802 remains almost entirely constant, even with variations in the RF variance 804.

Figure 9:
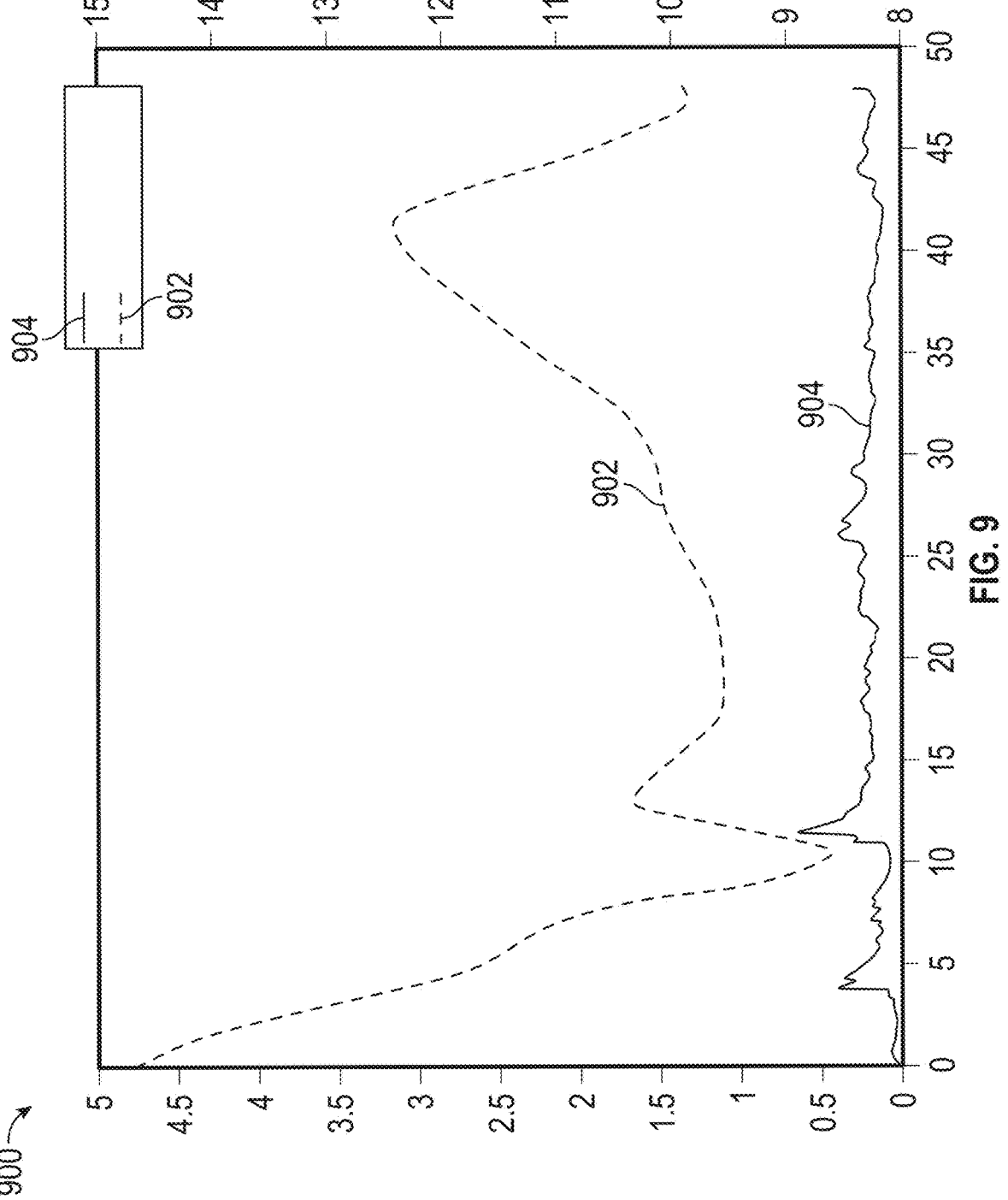

FIG. 9 shows a third graphical illustration 900 of RF corner speed 902 and RF variance 904 in a third scenario of a light gravel road (e.g., a light smooth road) at approximately ten meters per second (i.e., twenty-two miles per hour). As shown in this graphical illustration 900, under this scenario, the RF corner speed 902 remains fairly constant, but with greater magnitude of variance as compared with FIGS. 7 and 8, with variations in the RF variance 904.

Figure 10:
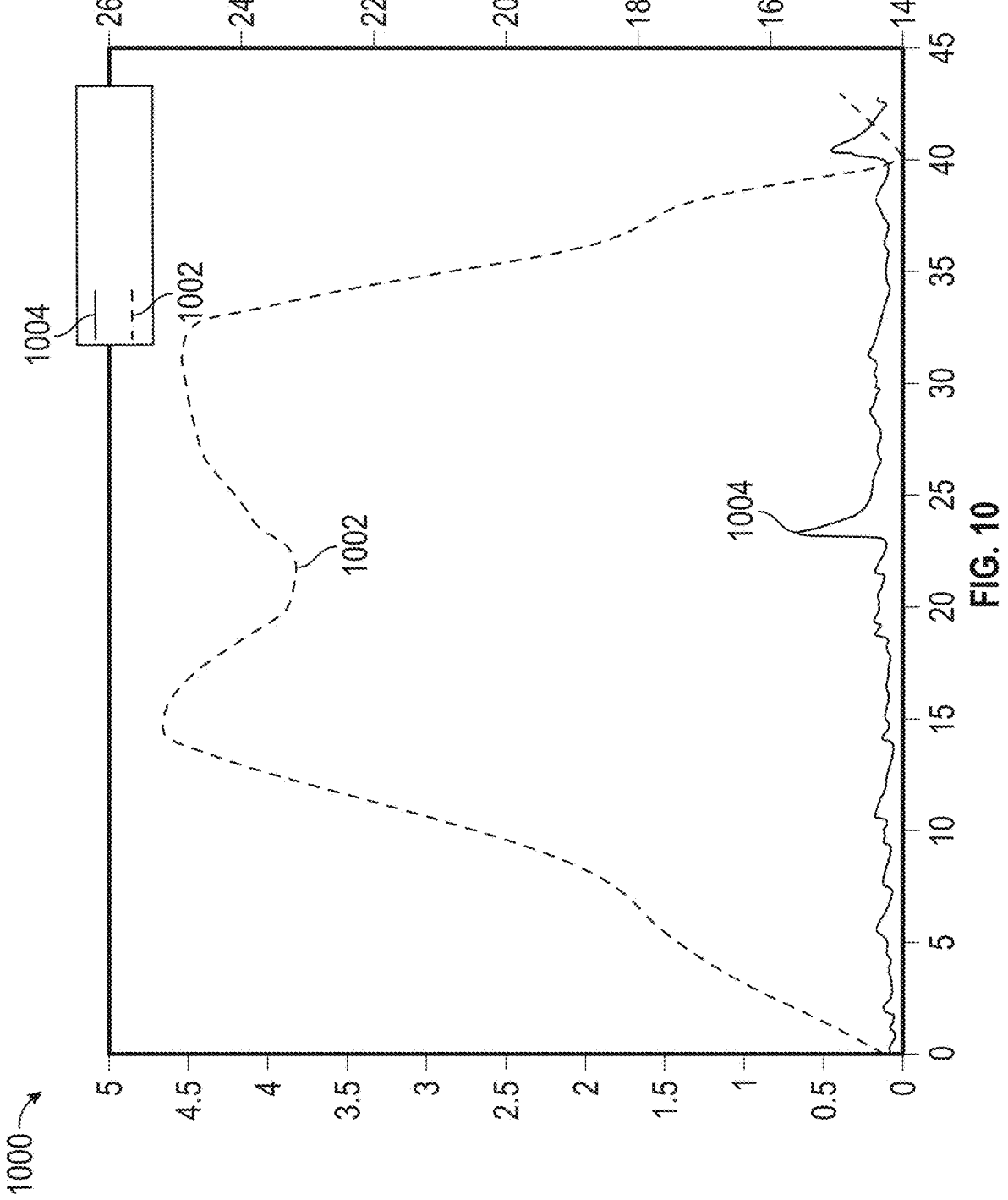

FIG. 10 shows a fourth graphical illustration 1000 of RF corner speed 1002 and RF variance 1004 in a fourth scenario of a light gravel road (e.g., a light smooth road) at approximately twenty-five meters per second (i.e., fifty-six miles per hour). As shown in this graphical illustration 1000, under this scenario, the RF corner speed 1002 remains fairly flat, but also with greater magnitude of variance as compared with FIGS. 7 and 8, with variations in the RF variance 1004.

Figure 11:
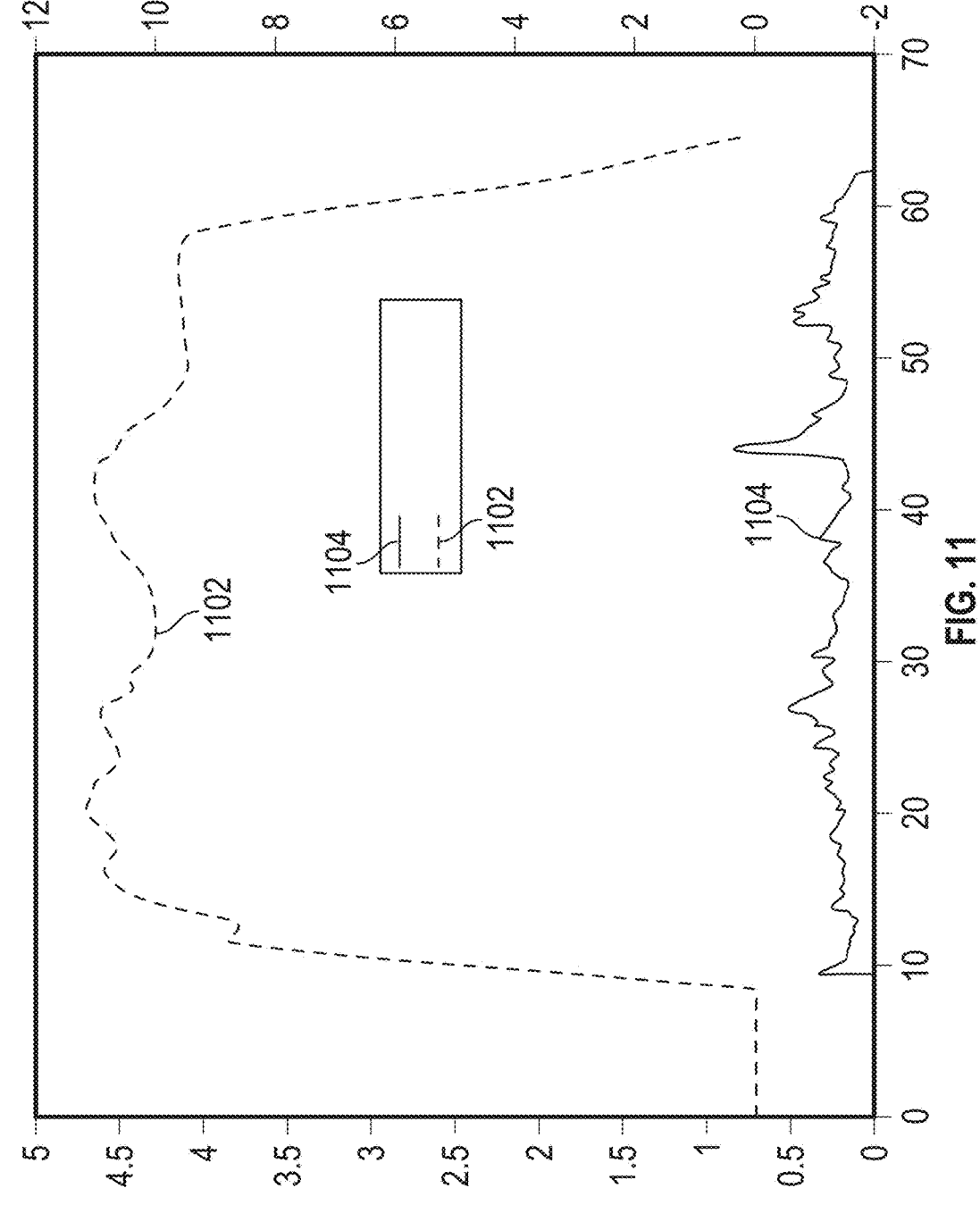

FIG. 11 shows a fifth graphical illustration 1100 of RF corner speed 1102 and RF variance 1104 in a fifth scenario of a heavy gravel road at approximately ten meters per second (i.e., twenty-two miles per hour). As shown in this graphical illustration 1100, under this scenario, the RF corner speed 1102 remains fairly flat, but with greater magnitude of variance as compared with FIGS. 7-10, with variations in the RF variance 1104.

Figure 12:
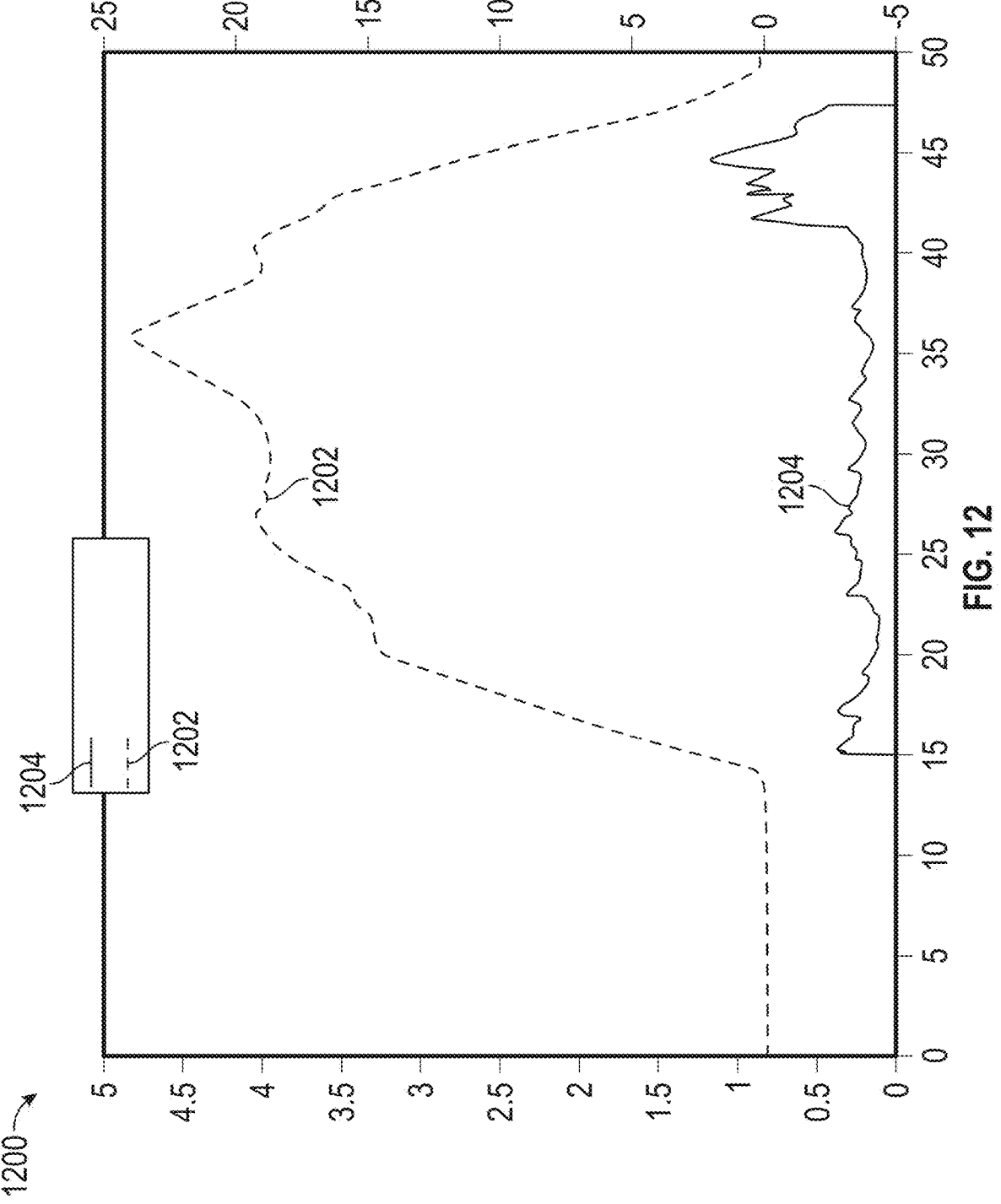

FIG. 12 shows a sixth graphical illustration 1200 of RF corner speed 1202 and RF variance 1204 in a sixth scenario of a heavy gravel road at approximately twenty-five meters per second (i.e., fifty-six miles per hour). As shown in this graphical illustration 1200, under this scenario, the RF corner speed 1202 remains fairly flat, but also with greater magnitude of variance as compared with FIGS. 7-10, with variations in the RF variance 1204.

Figure 13:
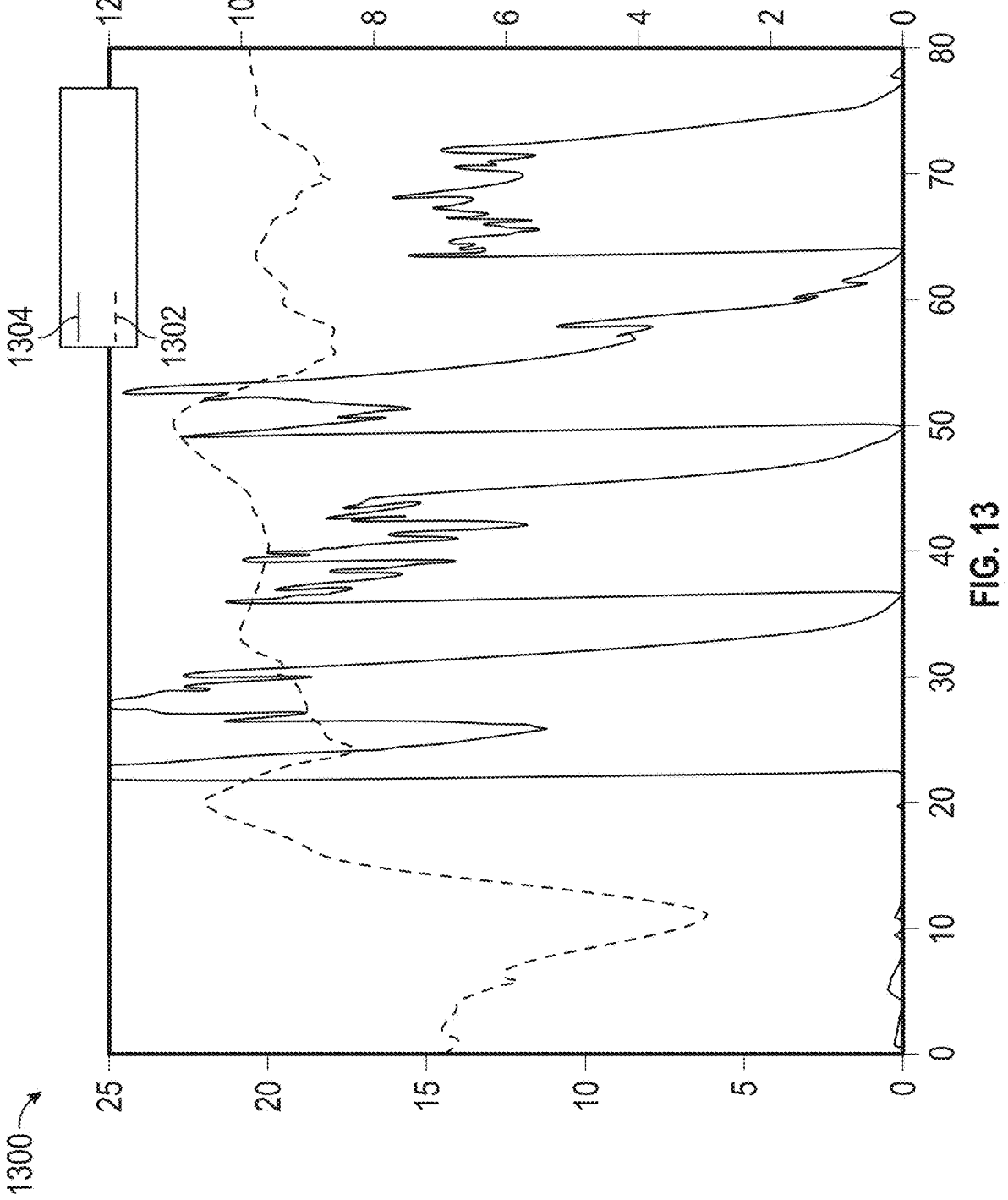

FIG. 13 shows a seventh graphical illustration 1300 of RF corner speed 1302 and RF variance 1304 in a seventh scenario of a road with heavy roughness (e.g., chatter bumps) at approximately ten meters per second (i.e., twenty-two miles per hour). As shown in this graphical illustration 1300, under this scenario, the RF corner speed 1302 shows significant magnitude of variance, with much greater magnitude of variance as compared with FIGS. 7-12, with variations in the RF variance 1304. In an exemplary embodiment, the chatter bumps are arranged into four distinct sections with smooth pavement in between, thereby resulting in the four distinct peaks in the variance.

Figure 14:
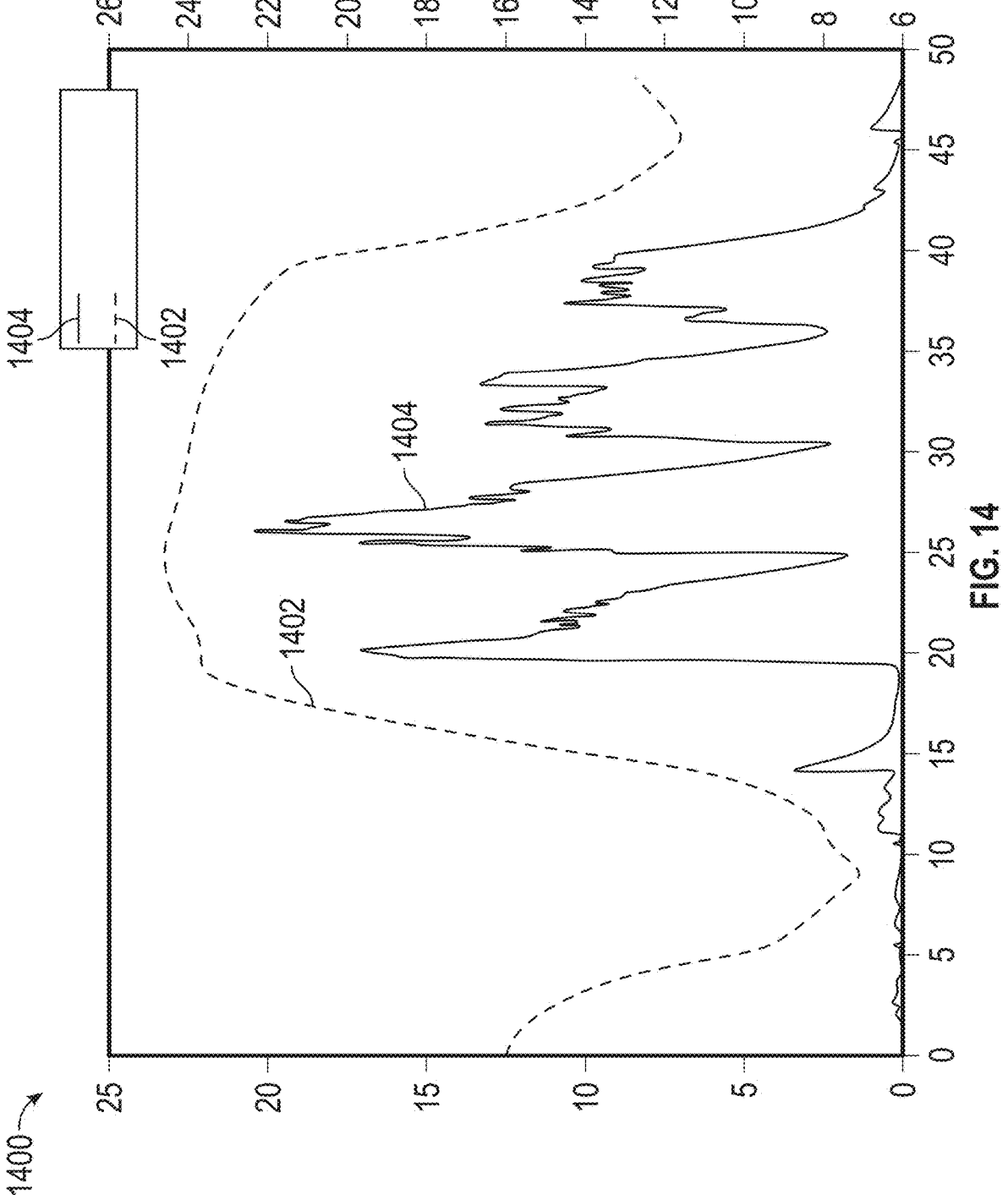

FIG. 14 shows an eighth graphical illustration 1400 of RF corner speed 1402 and RF variance 1404 in an eighth scenario of a road with heavy roughness (e.g., chatter bumps) at approximately twenty-five meters per second (i.e., fifty-six miles per hour). As shown in this graphical illustration 1400, under this scenario, the RF corner speed 1402 shows significant magnitude of variance, with much greater magnitude of variance as compared with FIGS. 7-12, with variations in the RF variance 1404. In an exemplary embodiment, the chatter bumps are arranged into four distinct sections with smooth pavement in between, thereby resulting in the four distinct peaks in the variance.

Figure 15:
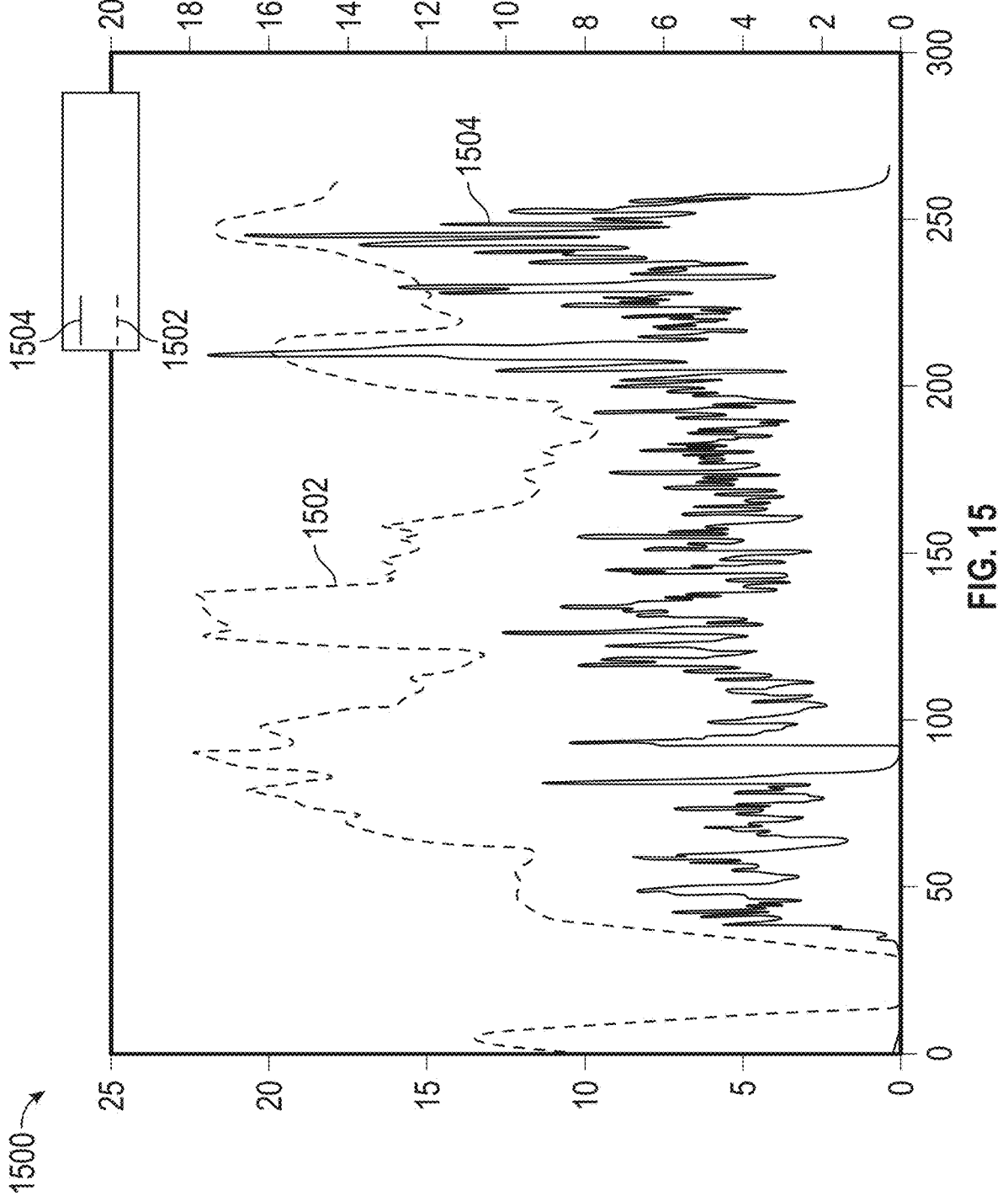

FIG. 15 shows a ninth graphical illustration 1500 of RF corner speed 1502 and RF variance 1504 in a ninth scenario of a road with extreme roughness (e.g., Belgian blocks or a cobblestone) at varying speeds. As shown in this graphical illustration 1500, under this scenario, the RF corner speed 1502 shows significant magnitude of variance, with much greater magnitude of variance as compared with FIGS. 7-12, with variations in the RF variance 1504.

Figure 16:
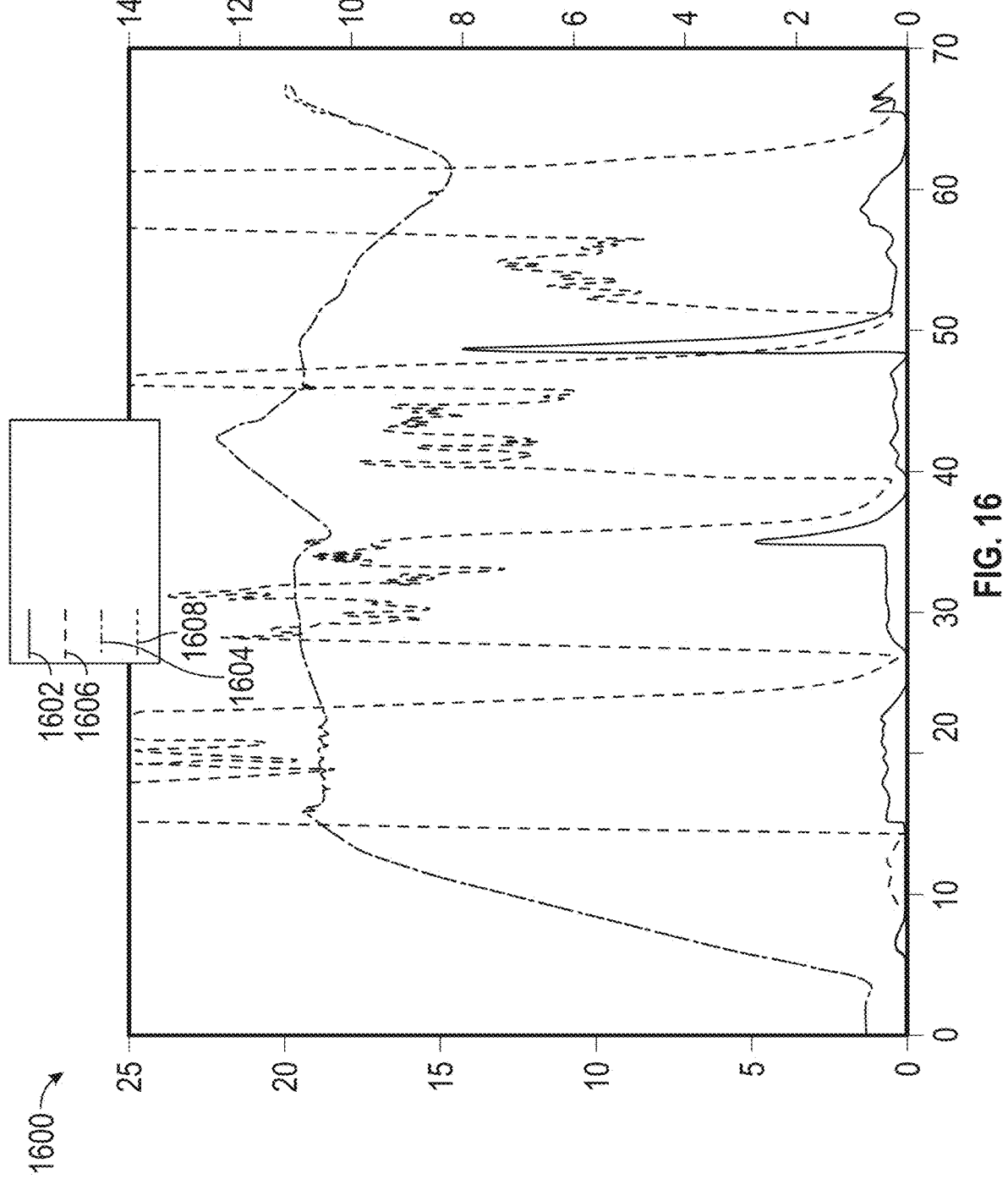

FIG. 16 shows a tenth graphical illustration 1600 of RF corner speed 1602 and RF variance 1604 in a tenth with a split roughness scenario, including a left side of the vehicle 100 driving over chatter bumps while side of the vehicle 100 is driven on smooth pavement. As shown in this graphical illustration 1600, under this scenario, the (right) RF corner speed 1602 varies relatively less with the (right) RF corning speed 1604; whereas the (left) variance 1606 varies relatively more with respect to the (left) LF corner speed 1608. In an exemplary embodiment, the chatter bumps are arranged into four distinct sections with smooth pavement in between, thereby resulting in the four distinct peaks in the variance.

Accordingly, methods, systems, and vehicles are provided for detecting a roughness of a road or path on which a vehicle is travelling, and for controlling vehicle actions based on the roughness of the road or path. In various embodiments, the roughness of the path is determined based on a variance of wheel speed sensor values from wheel speed sensors of the vehicle 100 along with various calculations and steps performed by the processor 142 of the vehicle 100 as described herein. Also in various embodiments, the processor 142 utilizes the determination as to the roughness for controlling one or more vehicle actions, including control of the braking system 108 of the vehicle 100.

It will be appreciated that the systems, vehicles, and methods may vary from those depicted in the Figures and described herein. For example, the vehicle 100 of FIG. 1, the control system 102 of FIG. 1, and/or components thereof may vary in different embodiments. It will similarly be appreciated that the steps of the process 200 may differ from that depicted in FIGS. 2-6, and/or that various steps of the process 200 may occur concurrently and/or in a different order than that depicted in FIGS. 2-6. It will also be appreciated that the implementations may differ in certain embodiments from those depicted in FIGS. 7-16.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:
1. A method comprising:
   obtaining, via one or more wheel speed sensors of a vehicle, wheel speed sensor data as to a speed of wheels of the vehicle;
   determining, via a processor of the vehicle, a variability of the wheel speed sensor data; and
   determining, via the processor, a measure of roughness of a path on which the vehicle is operating, based on the variability;
   wherein:

the measure of roughness is determined by the processor based on a rolling average of the variability of the wheel speed sensor data and also based on a rolling variance of the wheel speed sensor data;

the rolling average is calculated by the processor in accordance with the following equation: $X_n = X_{n-1} + (X_n - X_{n-1})/n$, in "$X_n$" represents wheel speed at a current time, $X_n$ represents a current rolling average at the current time, $X_{n-1}$ represents a previous rolling average, and "n" represents a number of samples in an average window; and the rolling variance is calculated by the processor in accordance with the following equation: $\sigma^2_n = \sigma^2_{n-1} + [(X_n - X_{n-1}) - \sigma^2_{n-1}]/n$, in which $\sigma^2_n$ represents a current variance, $\sigma^2_{n-1}$ represents a previous variance, and $X_n$ represents a current wheel noise sample.

2. The method of claim 1, further comprising:

taking a vehicle control action, in accordance with instructions provided by the processor, based on the measure of roughness.

3. The method of claim 2, wherein the step of taking the vehicle control action comprises controlling braking of the vehicle via a braking system of the vehicle based on the measure of roughness, in accordance with instructions provided by the processor.

4. The method of claim 2, further comprising:

binning, via the processor, the measure of roughness for the vehicle into one of the following categories:

(i) smooth, if the variability is less than a first predetermined threshold;

(ii) low, if the variability is greater than the first predetermined threshold and less than a second predetermined threshold;

(iii) mid, if the variability is greater than the second predetermined threshold and less than a third predetermined threshold;

(iv) high, if the variability is greater than the third predetermined threshold and less than a fourth predetermined threshold; and (v) extreme, if the variability is greater than the fourth predetermined threshold; and wherein the vehicle control action comprises adjusting a braking threshold for a braking system of the vehicle, in accordance with instructions providing by the processor to the braking system, based on the binning.

5. The method of claim 1, wherein the measure of roughness is determined by the processor also based on corner detection and rejection of the wheel speed sensor data.

6. The method of claim 1, wherein the calculating of the rolling average is implemented by the processor using Welford's algorithm.

7. A system comprising:

one or more wheel speed sensors of a vehicle that are configured to obtain wheel speed sensor data as to a speed of wheels of the vehicle; and a processor that is coupled to the one or more wheel speed sensors, the processor configured to at least facilitate:

determining a variability of the wheel speed sensor data; and determining a measure of roughness of a path on which the vehicle is operating, based on the variability;

wherein the processor is further configured to at least facilitate:

determining the measure of roughness based on a rolling average of the variability of the wheel speed sensor data and also based on a rolling variance of the wheel speed sensor data;

calculating the rolling average in accordance with the following equation: $X_n = X_{n-1} + (X_n - X_{n-1})/n$, in "$X_n$" represents wheel speed at a current time, $X_n$ represents current rolling average at the current time, $X_{n-1}$ represents a previous rolling average, and "n" represents a number of samples in an average window; and calculating the rolling variance of an average of the wheel speed sensor data in accordance with the following equation: $\sigma^2_n = \sigma^2_{n-1} + [(X_n - X_{n-1}) - \sigma^2_{n-1}]/n$, in which on represents a current variance, $\sigma^2_{n-1}$ represents a previous variance, and $X_n$ represents a current wheel noise sample.

8. The system of claim 7, wherein the processor is further configured to at least facilitate taking a vehicle control action via control of one or more of the following: torque distribution, propulsion control, and drive and suspension type, in accordance with instructions provided by the processor, based on the measure of roughness.

9. The system of claim 7, wherein the processor is further configured to at least facilitate controlling braking of the vehicle via a braking system of the vehicle based on the measure of roughness, in accordance with instructions provided by the processor.

10. The system of claim 7, wherein the processor is further configured to at least facilitate determining the measure of roughness also based on corner detection and rejection of the wheel speed sensor data.

11. The system of claim 7, wherein the processor is further configured to at least facilitate:

binning the measure of roughness for the vehicle into one of the following categories:

(i) smooth, if the variability is less than a first predetermined threshold;

(ii) low, if the variability is greater than the first predetermined threshold and less than a second predetermined threshold;

(iii) mid, if the variability is greater than the second predetermined threshold and less than a third predetermined threshold;

(iv) high, if the variability is greater than the third predetermined threshold and less than a fourth predetermined threshold; and (v) extreme, if the variability is greater than the fourth predetermined threshold; and adjusting a braking threshold for a braking system of the vehicle, in accordance with instructions provided by the processor to the braking system, based on the binning.

12. A vehicle comprising:

a body;

a drive system configured to move the body;

a braking system;

one or more wheel speed sensors that are configured to obtain wheel speed sensor data as to a speed of wheels of the vehicle; and a processor that is coupled to the one or more wheel speed sensors and to the braking system, the processor configured to at least facilitate:

determining a variability of the wheel speed sensor data;

determining a measure of roughness of a path on which the vehicle is operating, based on the variability, including by based on a rolling average of the variability of the wheel speed sensor data; a rolling variance of the wheel speed sensor data; and corner detection and rejection of the wheel speed sensor data; and controlling braking of the vehicle based on the measure of roughness, in accordance with instructions provided by the processor that are implemented by the braking system;

wherein the processor is further configured to at least facilitate:

calculating the rolling average in accordance with the following equation: $\bar{X}_n = \bar{X}_{n-1} + (X_n - \bar{X}_{n-1})/n$, in "$X_n$" represents wheel speed at a current time, $\bar{X}_n$ represents a current rolling average at the current time, $\bar{X}_{n-1}$ represents a previous rolling average, and "n" represents a number of samples in an average window;

calculating the rolling variance of an average of the wheel speed sensor data in accordance with the following equation: $\sigma^2_n = \sigma^2_{n-1} + [(X_n - \bar{X}_{n-1}) - \sigma^2_{n-1}]/n$, in which $\sigma^2_n$ represents a current variance, $\sigma^2_{n-1}$ represents a previous variance, and $X_n$ represents a current wheel noise sample;

binning the measure of roughness for the vehicle into one of the following categories:

(i) smooth, if the variability is less than a first predetermined threshold;

(ii) low, if the variability is greater than the first predetermined threshold and less than a second predetermined threshold;

(iii) mid, if the variability is greater than the second predetermined threshold and less than a third predetermined threshold;

(iv) high, if the variability is greater than the third predetermined threshold and less than a fourth predetermined threshold; and (v) extreme, if the variability is greater than the fourth predetermined threshold; and adjusting a braking threshold for the braking system of the vehicle, in accordance with instructions providing by the processor to the braking system, based on the binning.

13. The vehicle of claim 12, wherein the processor is further configured to at least facilitate automatically controlling each of the following: torque distribution, propulsion control, and drive and suspension type, in accordance with instructions provided by the processor, based on the measure of roughness.

\* \* \* \* \*